(12) United States Patent
Castrigno et al.

(10) Patent No.: US 8,419,842 B2
(45) Date of Patent: Apr. 16, 2013

(54) HYDRONIC SYSTEM AIR ELIMINATOR

(75) Inventors: Steven Castrigno, Manchester, NH (US); James Erhardt, Bedford, NH (US); Paul J. Lake, Waltham, MA (US); Jeffrey A. Scilingo, Londonderry, NH (US)

(73) Assignee: Watts Regulator Company, North Andover, MA (US)

( * ) Notice: Subject to any disclaimer, the term of this patent is extended or adjusted under 35 U.S.C. 154(b) by 274 days.

(21) Appl. No.: 12/940,321

(22) Filed: Nov. 5, 2010

(65) Prior Publication Data

US 2011/0107915 A1 May 12, 2011

Related U.S. Application Data

(60) Provisional application No. 61/258,928, filed on Nov. 6, 2009.

(51) Int. Cl.
*B01D 19/00* (2006.01)

(52) U.S. Cl.
USPC .................. 96/165; 95/244; 96/215; 96/207; 137/176

(58) Field of Classification Search .................... 95/244; 96/165, 166, 215, 206, 207, 163; 137/176, 137/210, 429; 210/120
See application file for complete search history.

(56) References Cited

U.S. PATENT DOCUMENTS

| | | | |
|---|---|---|---|
| 3,854,906 A | 12/1974 | Roffelsen | |
| 4,730,638 A * | 3/1988 | Hazelton | 137/202 |
| 5,123,938 A | 6/1992 | Nobel | |
| 5,490,874 A | 2/1996 | Kuster et al. | |
| 6,893,485 B2 | 5/2005 | MacDuff | |
| 7,364,609 B2 * | 4/2008 | MacDuff | 96/165 |

OTHER PUBLICATIONS

Spirovent, Junior Series Microbubble Separators and Dirt Separators; www.spirotherm.com , 2007.
Caleffi, DISCAL deaerator 551 series; http://www.caleffi.com.
ES-DuoVent; Watts Regulator, Series DuoVent High Capacity Air Vents with Manual Vent Feature; www.wattsreg.com, 2003.

* cited by examiner

*Primary Examiner* — Duane Smith
*Assistant Examiner* — Douglas Theisen
(74) *Attorney, Agent, or Firm* — Edwards Wildman Palmer LLP; David J. Silvia; George N. Chaclas

(57) ABSTRACT

An air eliminator including a housing having first and second portions, the housing defining: a chamber, an inlet in fluid communication with the chamber; an outlet in fluid communication with the chamber; and an axis extending from the first portion to the second portion, a float assembly connected to the first portion of the chamber for releasing air from the chamber, and degassing disks stacked within the chamber along an axis, wherein each disk includes a plurality of rings such that the degassing disks cause micro gas pockets in water passing through the chamber to combine into relatively large and buoyant air pockets that collect and pass along the axis to the float assembly for release.

19 Claims, 11 Drawing Sheets

HYDRONIC SYSTEM AIR ELIMINATOR

CROSS-REFERENCE TO A RELATED APPLICATION

This application claims priority to U.S. Provisional Patent Application No. 61/258,928 filed Nov. 6, 2009, which is incorporated herein by reference.

TECHNICAL FIELD OF THE DISCLOSURE

The present disclosure relates to an air eliminator for removing air from pipes and, more specifically, to an air eliminator for removing air from fluid flowing through a pipe of a closed heating and/or cooling system, or an open water distribution system.

BACKGROUND OF THE DISCLOSURE

Air containing oxygen present in water traveling through a hydronic heating systems can cause corrosion of system components. Also, air present in the water creates erratic pumping performance, vibrating noise (e.g., knocking) and other undesirable effects.

What is still desired is a new and improved air eliminator that can be used to remove air from hydronic heating systems.

SUMMARY OF THE DISCLOSURE

Exemplary embodiments of the present disclosure provide a new and improved air eliminator for removing air from water circulating in a hydronic heating system.

According to one aspect of the disclosure, the air eliminator includes a body defining a chamber, an inlet and outlet connected to the chamber, and a float assembly connected to a top of the chamber. Contained in the chamber are vertically stacked degassing disks, wherein each disk includes a plurality of rings. The degassing disks cause micro gas pockets in water passing through the chamber to combine into relatively large and buoyant air pockets that will rise to the top of the air eliminator and be released through the float assembly.

According to another aspect of the disclosure, the air eliminator includes a fixed flange secured to one of the inlet and the outlet of the body, and a swivel flange secured to the other of the inlet and the outlet. Each flange includes an opening for receiving fasteners, such as bolts, for securing the air eliminator to connecting pipes of a hydronic heating system.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF DRAWINGS

Reference is made to the attached drawings, wherein elements having the same reference character designations represent like elements throughout, and wherein.

DETAILED DESCRIPTION OF AN EXEMPLARY EMBODIMENT

Figure 1:
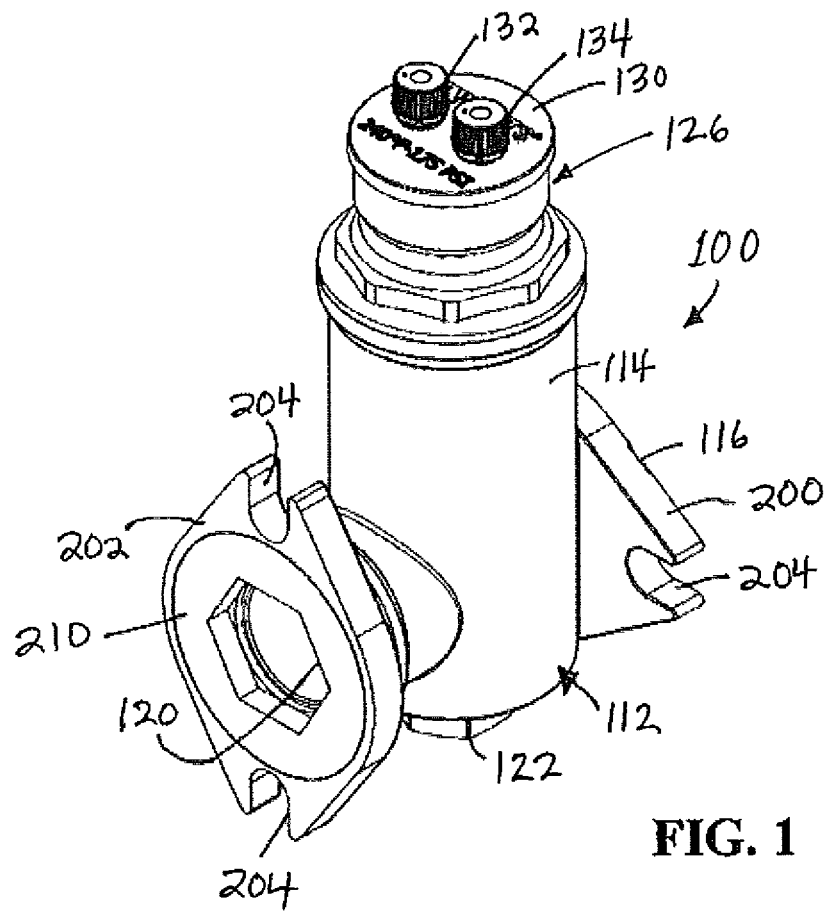
FIG. 1 is a top perspective view of an exemplary embodiment of an air eliminator constructed in accordance with the present disclosure.
Figure 2:
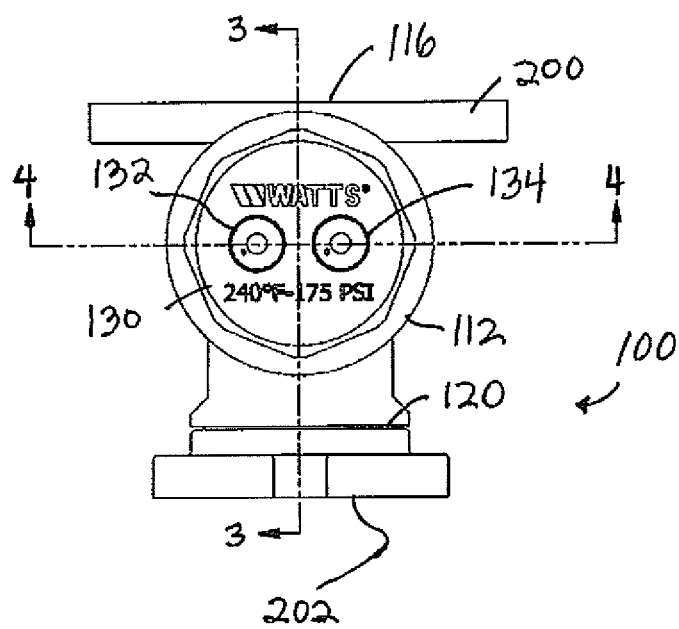
FIG. 2 is a top plan view of the air eliminator of FIG. 1.
Figure 3:
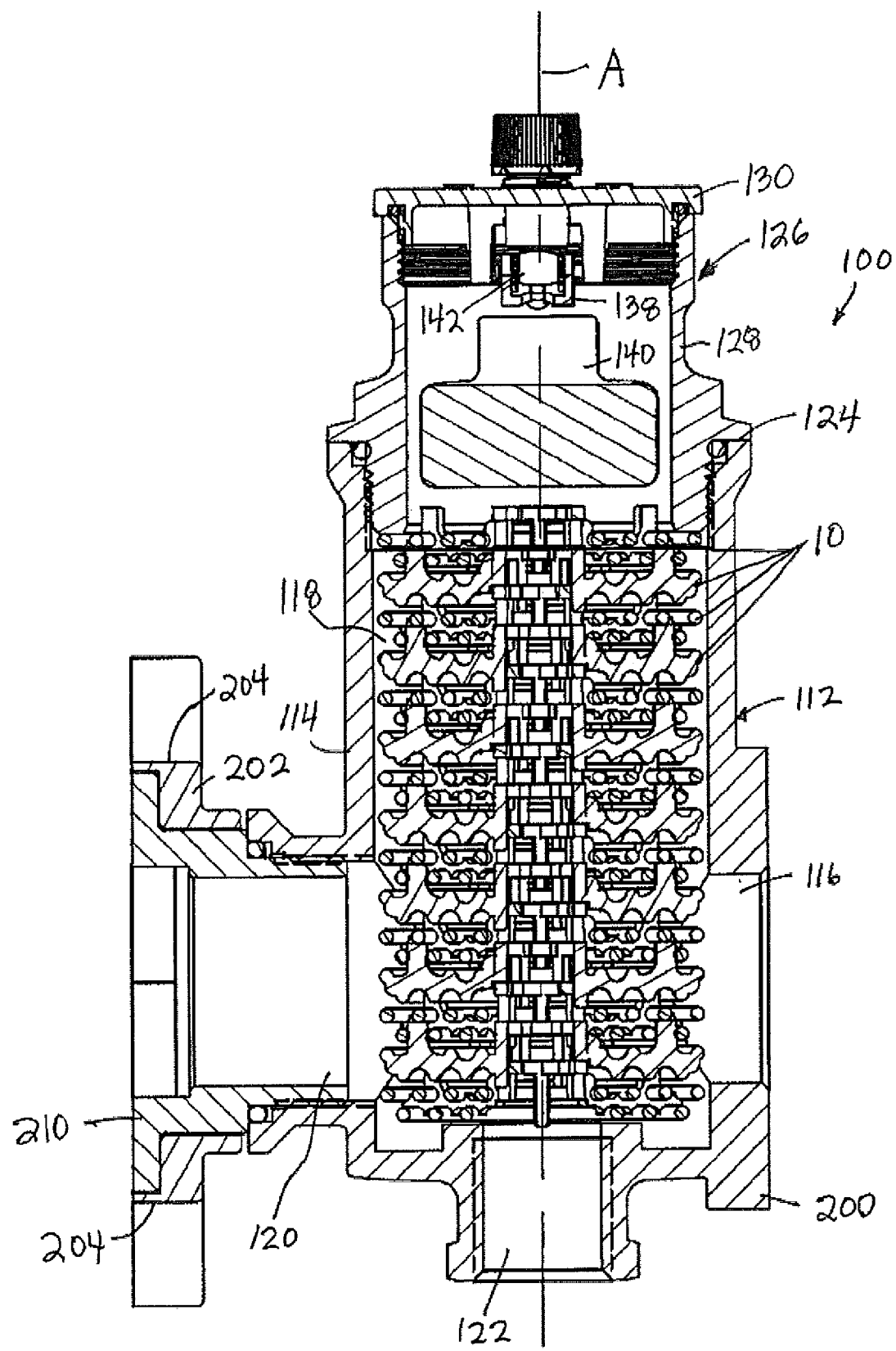
FIG. 3 is a sectional view of the air eliminator of FIG. 1 taken along line 3-3 of FIG. 2, wherein stacked degassing disks constructed in accordance with the present disclosure is shown.
Figure 4:
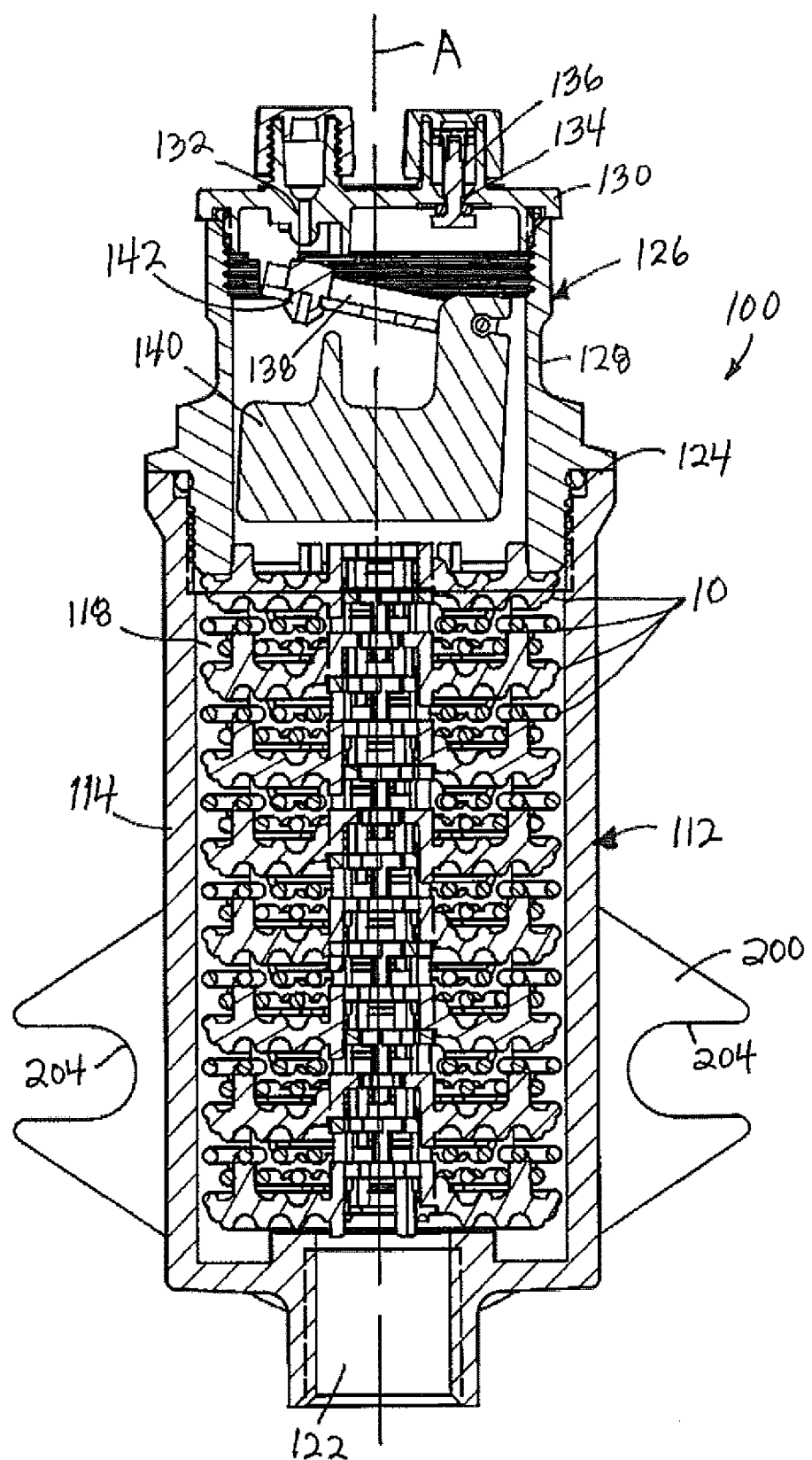
FIG. 4 is a sectional view of the air eliminator of FIG. 1 taken along line 4-4 of FIG. 2.
Figure 5:
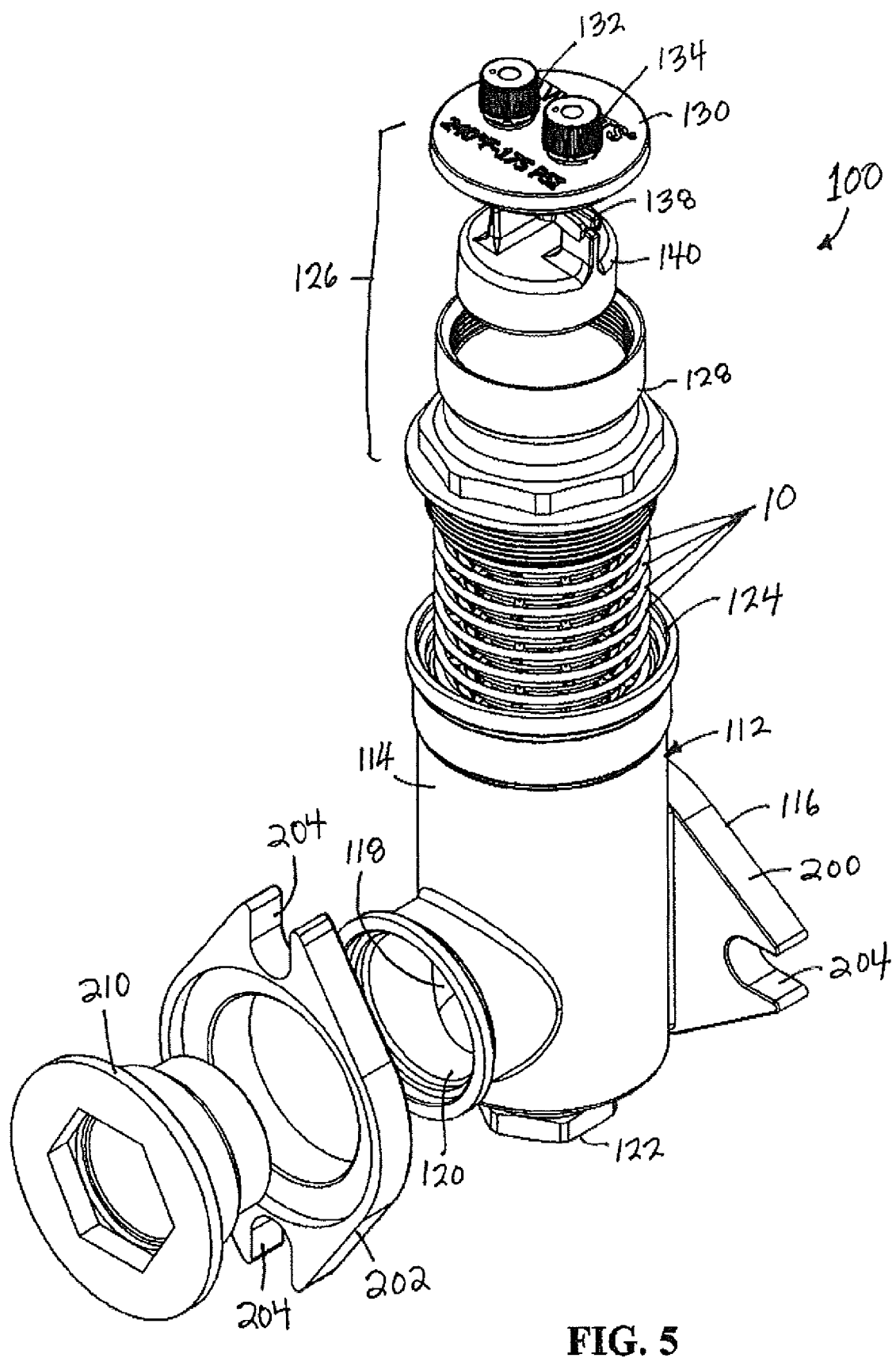
FIG. 5 is an exploded top perspective view of the air eliminator of FIG. 1.
Figure 6:
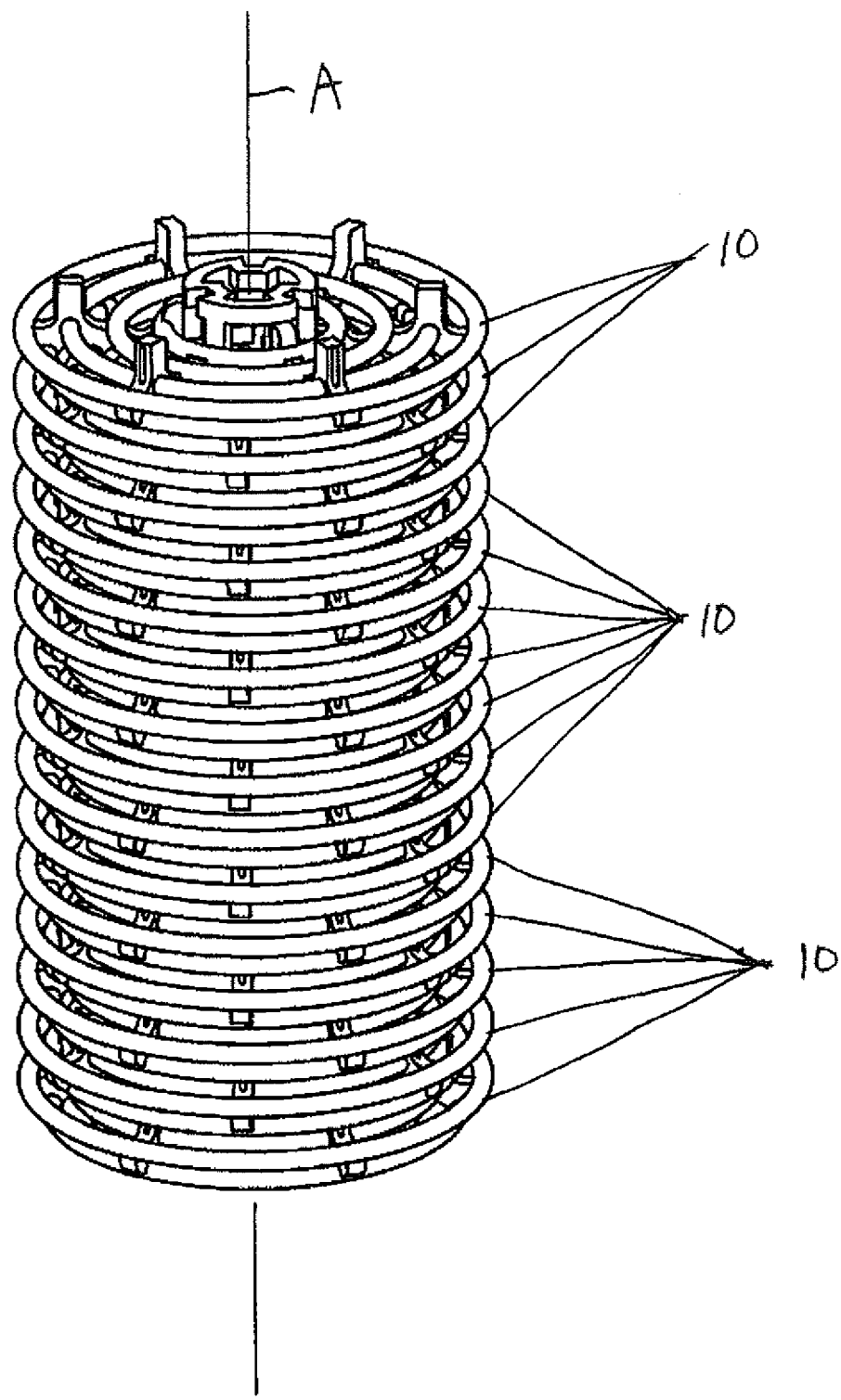
FIG. 6 is a top perspective view of the stacked degassing disks of the air eliminator of FIG. 1.
Figure 7:
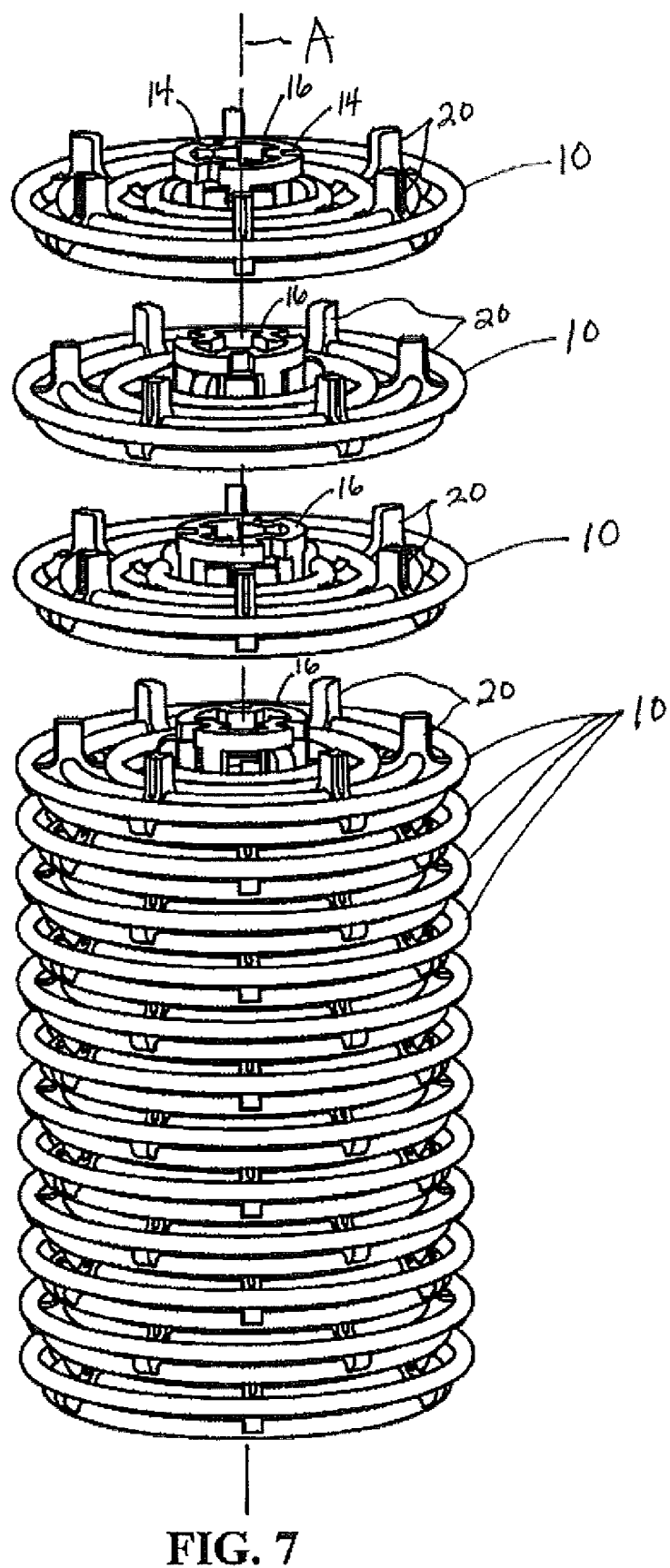
FIG. 7 is a partially exploded top perspective view of the stacked degassing disks of the air eliminator of FIG. 1.
Figure 8:
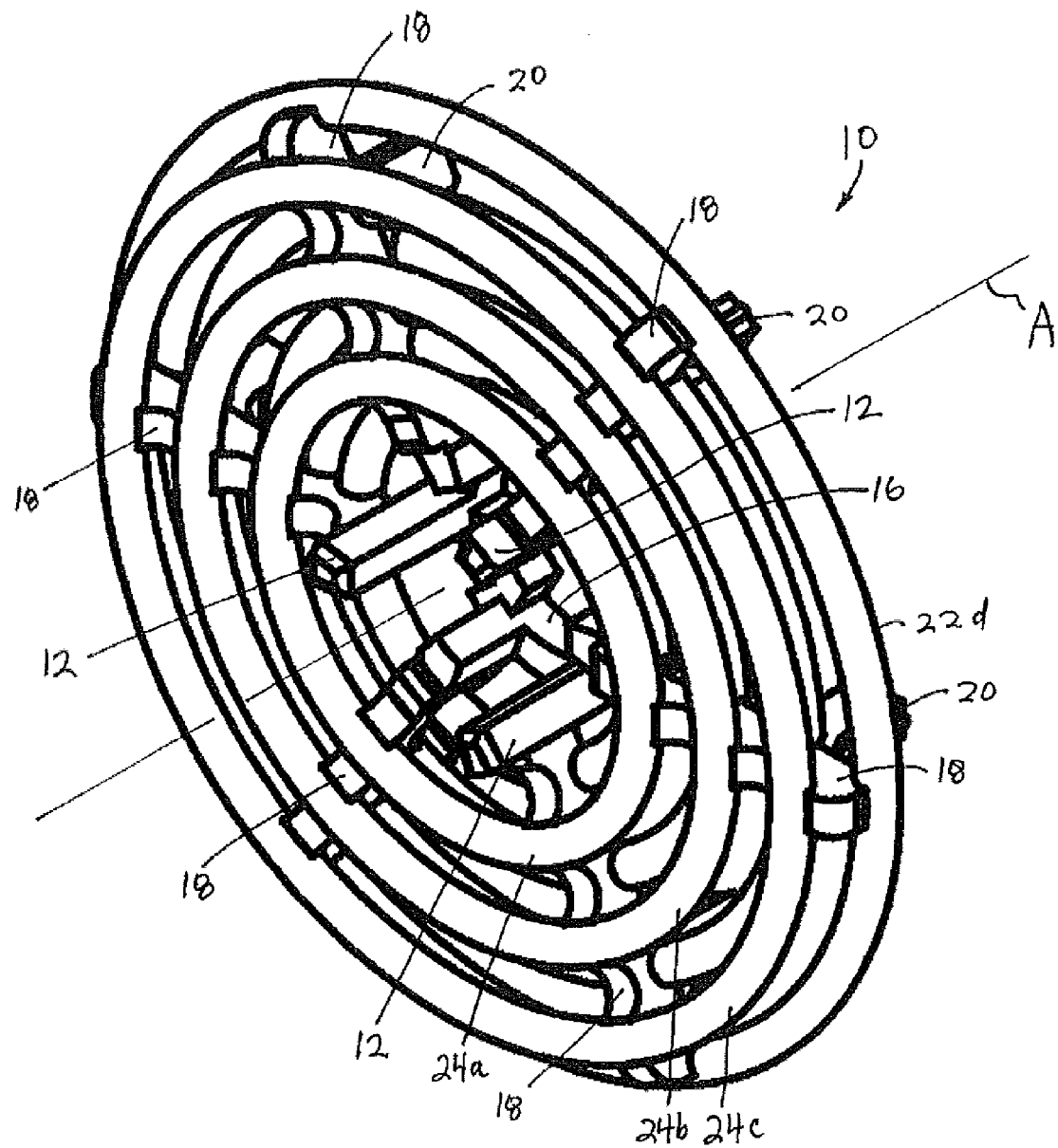
FIG. 8 is a bottom perspective view of one of the degassing disks of the air eliminator of FIG. 1.
Figure 9:
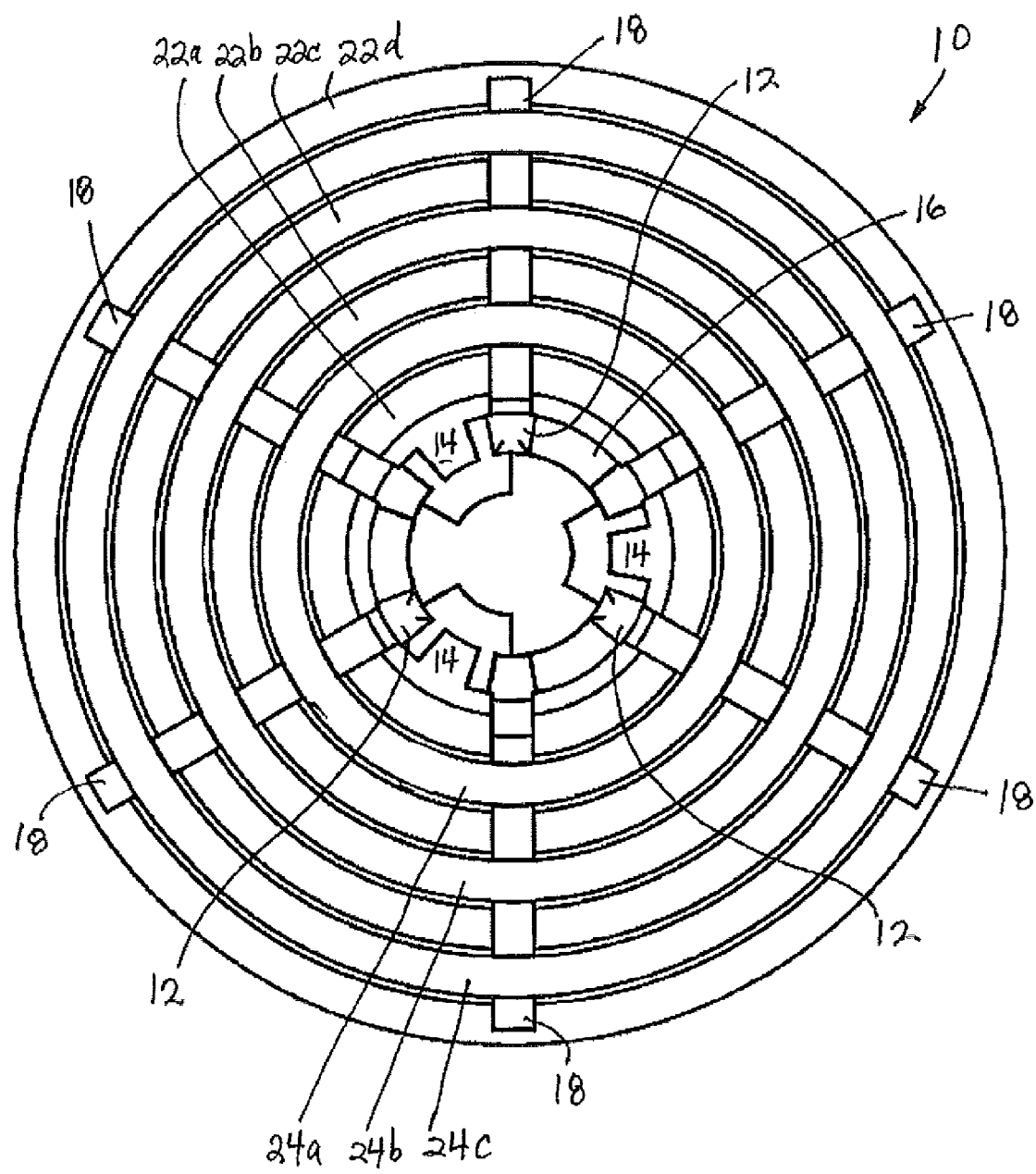
FIG. 9 is a bottom plan view of the degassing disk.
Figure 10:
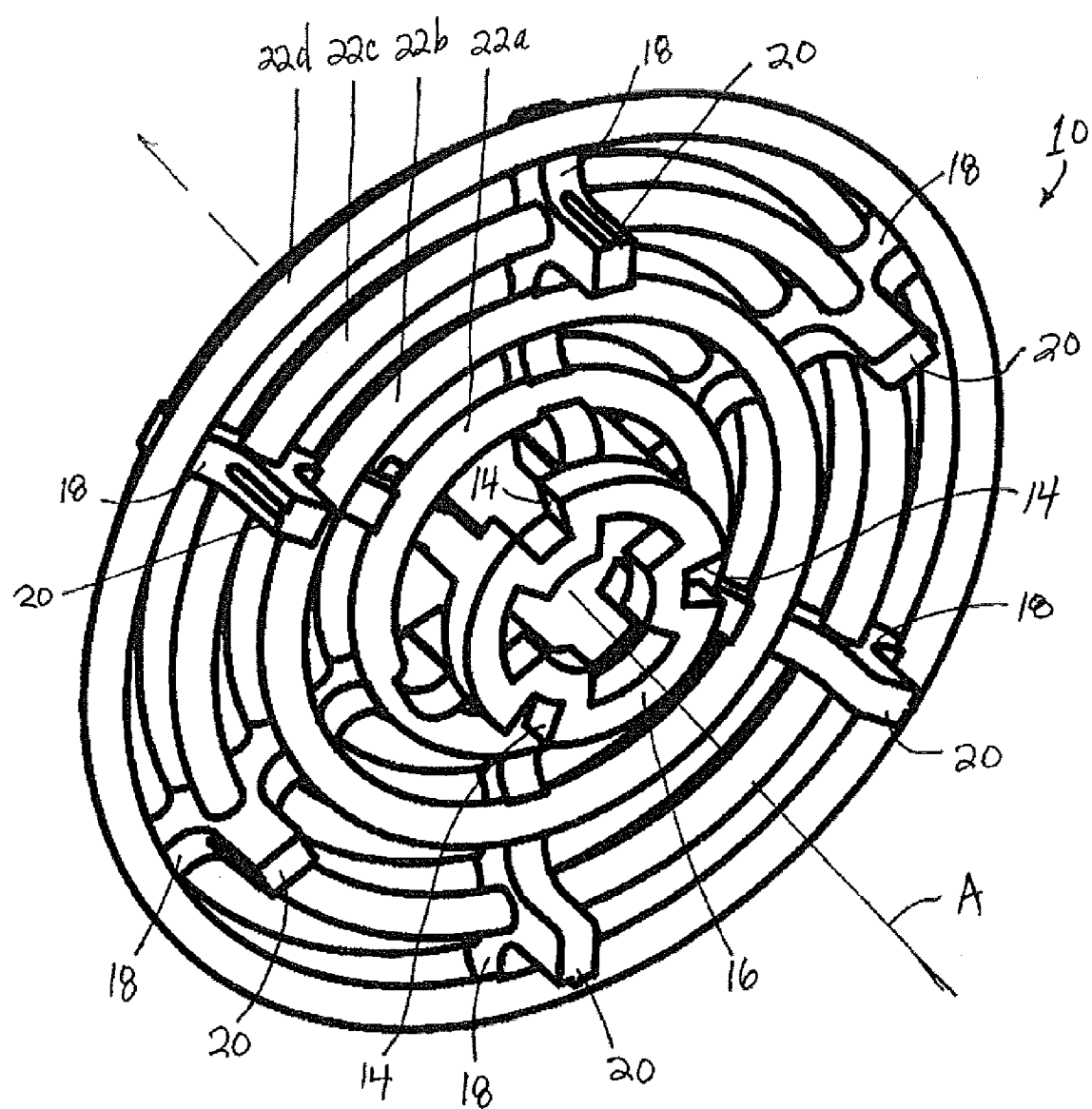
FIG. 10 is a top perspective view of the degassing disk.
Figure 11:
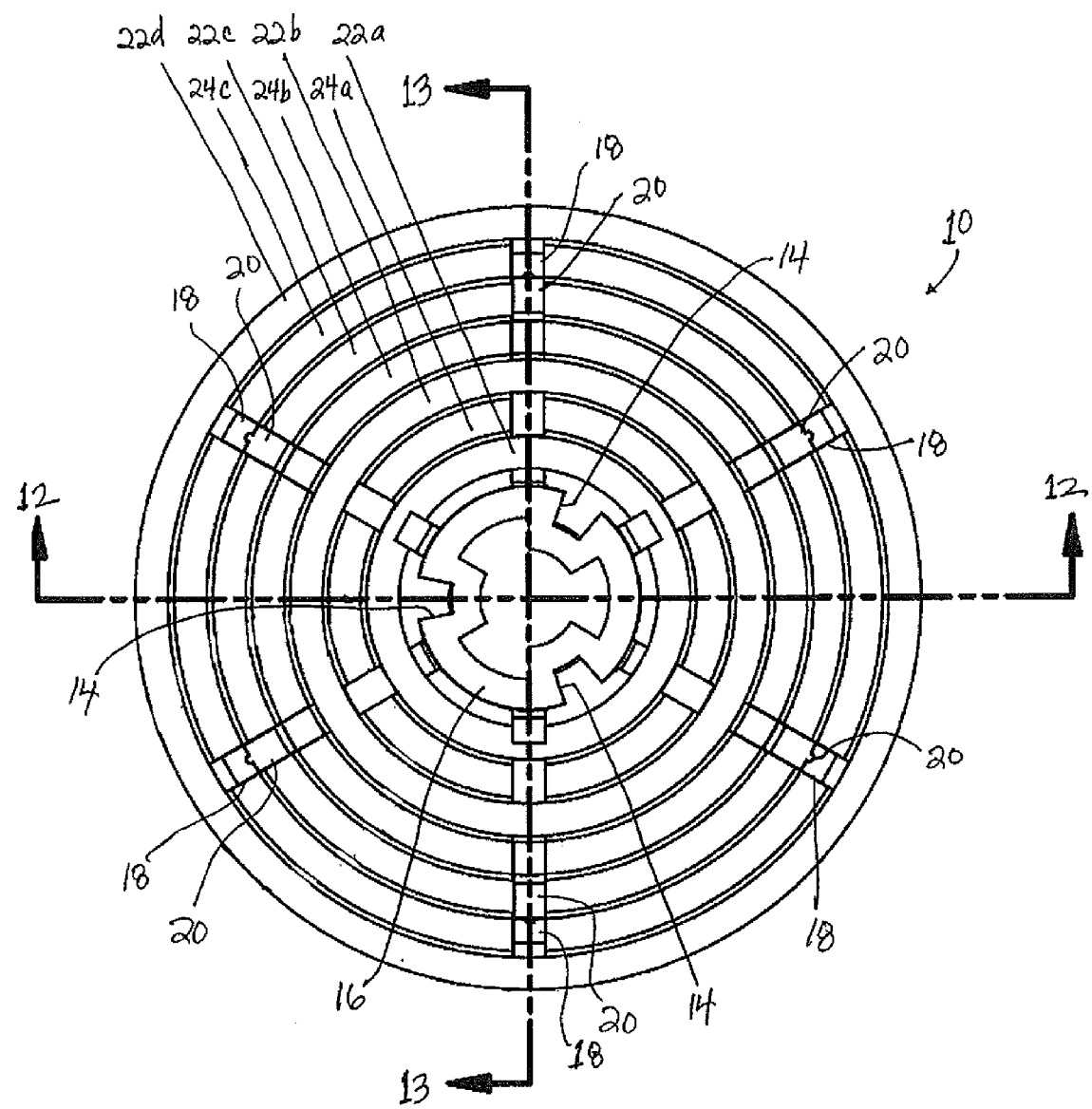
FIG. 11 is a top plan view of the degassing disk.

Referring now to the detailed drawings, FIGS. 1-5 show an exemplary embodiment of an air eliminator 100 that can be used, for example, to remove gas such as air from a liquid such as water circulating in a hydronic heating system. The air eliminator 100 contains a stack of degassing disks 10 constructed in accordance with the present disclosure. Exemplary embodiments of the degassing disks are shown in FIGS. 3-13.

The air eliminator 100 includes a housing, generally indicated at 112, having a cylindrical side wall 114, which may be fabricated from bronze or stainless steel. Formed in the side wall 114 is an inlet 116 for allowing the passage of fluid into a chamber 118 (FIGS. 3 and 4) of the housing 112 and an outlet 120 for discharging fluid from the chamber 118. The cylindrical side wall 114 of the housing 120 extends in a direction generally transverse to the direction of flow of fluid between the inlet and the outlet 116, 120. The housing 112 also includes an opening 122 in the bottom of the chamber 118 which can be connected to an expansion tank (not shown) or plugged, and an open top 124 receiving a float assembly 126.

The float assembly 126 includes a tubular body 128 extending upward from the open top 124 of the housing 112 and a cap 130 sealing the top of the tubular body. The cap 130 includes a first vent 132 and a second vent 134. A poppet valve 136 is seated in the second vent 134 and can be manually operated to release air from the air eliminator 100. An arm 138 has a first end pivotally connected to the cap 130 and a second end pivotally connected to a float 140. A plug 142 is secured to the arm 138 such that, when rising water in the chamber 118 causes the float 140 to rise, the plug 142 blocks the first vent 132 to prevent air from exiting the chamber 118 through the first vent 132. Otherwise the vent 132 normally remains open to allow air to exit the chamber 118.

The arrangement is such that as fluid flows into the chamber 118 through the inlet 116 and out of the chamber 118 through the outlet 120, relatively large and buoyant air pockets present in the fluid in the chamber 118 tend to rise to the surface of the fluid and escape the housing 112 through the float assembly 126. It is well known, however, that smaller "micro" gas pockets which are present in the fluid maintain their presence in the fluid as the fluid flows from the inlet 116 into the chamber 118 and through the outlet 120, i.e., the micro gas pockets do not rise to the surface. These micro gas pockets have a tendency to combine with one another to form larger gas pockets which produce the undesirable effects in a hydronic heating system. The uncombined micro gas pockets also contain oxygen which produces corrosion of pipes. Thus, it is desirable to remove the micro gas pockets as well. The degassing disks 10 of the present disclosure cause the micro gas pockets to combine into relatively large and buoyant air pockets that will rise to the top of the air eliminator 100 and be released through the float assembly 126.

Referring to FIGS. 3-7, the degassing disks 10 are vertically stacked along axis "A" and are properly aligned and interlocked with keys 12 and sockets 14. Referring to FIGS. 8-13, each disk 10 includes a central hub 16, spokes 18 extending radially outwardly from the hub 16, and vertical spacers 20 extending upwardly from at least some of the spokes 18. In the exemplary embodiment shown, the disks 10 include six spokes 18 and each spoke includes a vertical spacer 20. Top surfaces 20a of the spacers 20 are level with a top surface 16a of the hub 16, as shown best in FIGS. 12 and 13.

The keys 12 extend downwardly from the central hub 16, while the sockets 14 are formed in a top portion of the hub 16. During vertical assembly and stacking of the disks 10, the keys 12 of an upper disk are inserted into the sockets 14 of a lower disk. The keys 12 and the sockets 14 are positioned such that the spokes 18 of an upper disk 10 are offset with respect to the spokes 18 of a lower disk 10. This is best shown in the exploded view of FIG. 7. In the exemplary embodiment shown, the disks are offset 30° clockwise or counter-clockwise. The offset spokes 18 allows the spacers 20 of adjacent disks 10 to also be offset. In the exemplary embodiment shown, the disks 10 include three keys 12 which extend downwardly from the central hub 16 in alignment with three of the spokes 18, while the top portion of the hub 16 include three of the sockets 14 aligned between the spokes 18.

Figure 12:
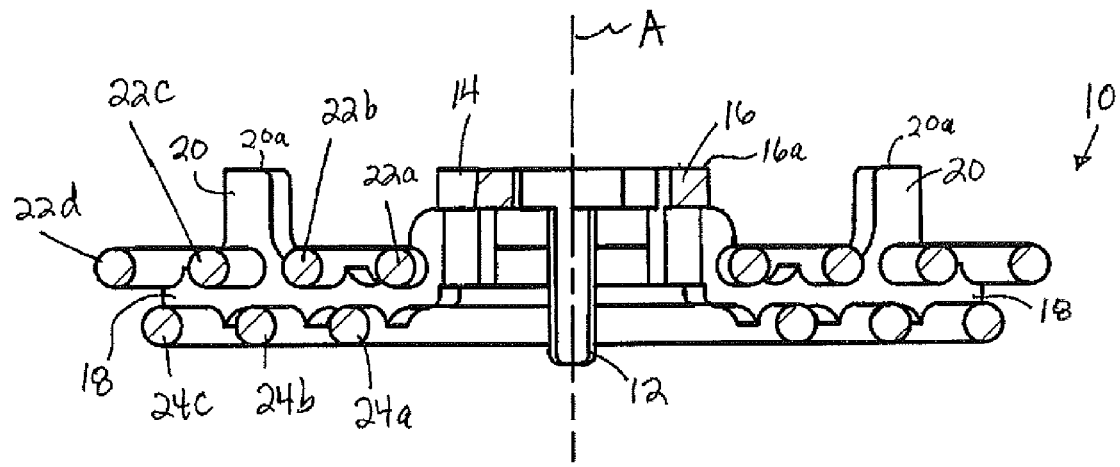
FIG. 12 is a sectional view of the degassing disk taken along line 12-12 of FIG. 11.
Figure 13:
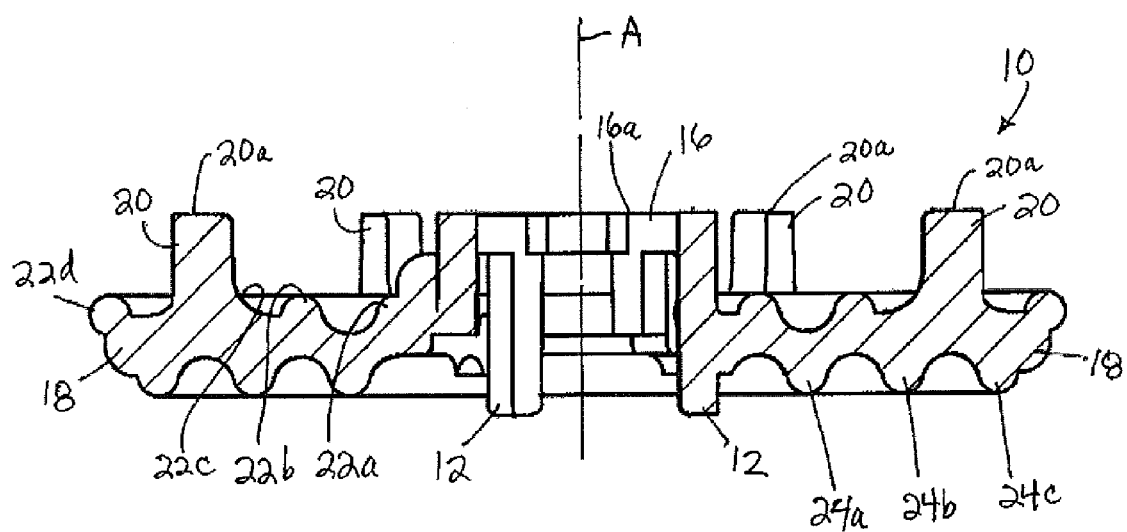
FIG. 13 is a sectional view of the degassing disk taken along line 13-13 of FIG. 11.

Each disk 10 also includes a plurality of rings 22a-22d and 24a-24c. Rings 22a-22d are coaxially arranged with axis "A," are progressively larger in radius, and are positioned on top surfaces of the spokes 18. Rings 24a-24c are coaxially arranged with axis "A," are progressively larger in radius, and are positioned on bottom surfaces of the spokes 18. As shown best in FIGS. 9 and 11, the rings are sized from smallest radius to largest radius in the following order 22a, 24a, 22b, 24b, 22c, 24c, 22d. In the exemplary embodiment shown, each ring is circular and, as best shown in FIG. 12, each ring has a circular cross-section. Degassing disks 10 according to the present disclosure can be provided with more or less than seven rings, and the rings can be provided with non-circular shapes and cross-sections.

Degassing disks 10 according to the present disclosure can be provided as single unitary pieces made from suitable material, such as plastic, stainless steel, brass, bronze or the like and combinations thereof. A suitable plastic is polysulfone.

Referring to FIGS. 1-5, the air eliminator 100 also includes a fixed flange 200 secured to one of the inlet 116 and the outlet 120 of the body 112, and a swivel flange 202 secured to the other of the inlet and the outlet. Each flange 200, 202 includes openings 204 for receiving fasteners, such as bolts, for securing the air eliminator to connecting pipes of a hydronic heating system. The swivel flange 202 is secured to the outlet 120 with a tubular collar 210, such that the swivel flange 202 is secured to the body 112 but is free to rotate, or swivel, about the collar 210. In the exemplary embodiment shown, the collar 210 is secured to the outlet 120 with screw threads.

The exemplary embodiments described in this specification have been presented by way of illustration rather than limitation, and various modifications, combinations and substitutions may be effected by those skilled in the art without departure either in spirit or scope from this disclosure in its broader aspects.

What is claimed is:

1. An air eliminator comprising:
   a housing having first and second portions, the housing defining: a chamber, an inlet in fluid communication with the chamber; an outlet in fluid communication with the chamber; and an axis extending from the first portion to the second portion;
   a float assembly connected to the first portion of the chamber for releasing air from the chamber; and
   degassing disks stacked within the chamber along the axis, wherein each disk includes a plurality of rings such that the degassing disks cause micro gas pockets in water passing through the chamber to combine into relatively large and buoyant air pockets that collect and pass along the axis to the float assembly for release.

2. An air eliminator as recited in claim 1, further comprising a fixed flange secured to one of the inlet and the outlet, and a swivel flange secured to the other of the inlet and the outlet.

3. An air eliminator as recited in claim 2, wherein each flange includes an opening for receiving at least one fastener for securing the air eliminator to connecting pipes of a hydronic heating system.

4. An air eliminator as recited in claim 3, wherein the swivel flange includes with a tubular collar for securing the swivel flange to the outlet such that the swivel flange is free to rotate about the tubular collar.

5. An air eliminator as recited in claim 1, wherein the housing has a cylindrical side wall extending in a direction generally along the axis and a direction of flow of fluid between the inlet and the outlet is transverse to the axis.

6. An air eliminator as recited in claim 1, further comprising an expansion tank connected to the second portion of the housing.

7. An air eliminator as recited in claim 1, wherein the float assembly includes:
   a tubular body extending along the axis out of the housing and a cap sealing the tubular body, the cap having a first normally open vent and a second vent, the second vent having a poppet valve seated therein;
   a float within the tubular body;
   an arm having a first end pivotally connected to the cap and a second end pivotally connected to the float; and
   a plug secured to the arm such that when fluid in the chamber causes the float to move along the axis towards the first portion, the plug blocks the first vent to prevent air from exiting the chamber there through.

8. An air eliminator as recited in claim 1, wherein each disk includes a central hub, spokes extending radially outwardly from the central hub, and vertical spacers extending from a plurality of the spokes, and each disk defines at least one key and socket for aligning and interlocking with an adjacent disk.

9. An air eliminator as recited in claim 8, wherein each disk includes six spokes and each spoke has a vertical spacer.

10. An air eliminator as recited in claim 8, wherein the at least one key and socket are positioned such that the spokes of each disk are offset with respect to the spokes of the adjacent disks.

11. An air eliminator as recited in claim 8, wherein a portion of the ring is positioned on first surfaces of the spokes and a second portion is positioned on second surfaces of the spokes opposing the first surfaces.

12. An air eliminator as recited in claim 1, wherein the plurality of rings are coaxially arranged with the axis, each ring having a different size radius.

13. An air eliminator comprising:
- a housing having first and second portions, the housing defining: a chamber, an inlet in fluid communication with the chamber; an outlet in fluid communication with the chamber; and an axis extending from the first portion to the second portion;
- a float assembly connected to the first portion of the chamber for releasing air from the chamber; and
- means for causing micro gas pockets in water passing through the chamber to combine into relatively large and buoyant air pockets that collect and pass along the axis to the float assembly for release,
- wherein the means for causing micro gas pockets includes a plurality of components with a central hub, spokes extending radially outwardly from the central hub, and vertical spacers extending from a plurality of the spokes, and each component defines at least one key and socket for aligning and interlocking with an adjacent component.

14. An air eliminator as recited in claim 13, wherein the means is degassing disks stacked within the chamber along the axis, wherein each disk includes a plurality of rings.

15. An air eliminator comprising:
- a housing having first and second portions, the housing defining: a chamber, an inlet in fluid communication with the chamber; an outlet in fluid communication with the chamber; and an axis extending from the first portion to the second portion;
- a float assembly connected to the first portion of the chamber for releasing air from the chamber, the float assembly including a tubular body extending along the axis out of the housing, a cap sealing the tubular body, the cap having a first normally open vent and a second vent, a poppet valve seated in the second vent, a float within the tubular body, an arm having a first end pivotally connected to the cap and a second end pivotally connected to the float, and a plug secured to the arm such that when fluid in the chamber causes the float to move along the axis towards the first portion, the plug blocks the first vent to prevent air from exiting the chamber there through; and
- means for causing micro gas pockets in water passing through the chamber to combine into relatively large and buoyant air pockets that collect and pass along the axis to the float assembly for release,
- wherein the means for causing micro gas pockets includes a plurality of components with a central hub, spokes extending radially outwardly from the central hub, and vertical spacers extending from a plurality of the spokes, and each component defines at least one key and socket for aligning and interlocking with an adjacent component.

16. An air eliminator as recited in claim 15, wherein the means is degassing disks stacked within the chamber along the axis, wherein each disk includes a plurality of rings.

17. An air eliminator as recited in claim 15, wherein each disk includes six spokes, each spoke has a vertical spacer, the keys and the sockets are positioned such that the spokes of each disk are offset with respect to the spokes of the adjacent disks.

18. An air eliminator as recited in claim 16, wherein each disk includes a plurality of rings coaxially arranged with the axis, each ring having a different size radius, and a portion of the ring is positioned on first surfaces of the spokes and a second portion is positioned on second surfaces of the spokes opposing the first surfaces.

19. An air eliminator as recited in claim 16, further comprising a fixed flange secured to one of the inlet and the outlet, and a swivel flange secured to the other of the inlet and the outlet, wherein each flange includes an opening for receiving at least one fastener for securing the air eliminator to connecting pipes of a hydronic heating system.

\* \* \* \* \*